(12) United States Patent
Grossmann et al.

(10) Patent No.: US 10,445,707 B2
(45) Date of Patent: Oct. 15, 2019

(54) METHOD AND SYSTEM FOR INFORMATION INTEGRATION IN INDUSTRIAL SYSTEMS

(71) Applicant: UNIVERSITY OF SOUTH AUSTRALIA, Adelaide (AU)

(72) Inventors: Georg Grossmann, Stirling (AU); Markus Stumptner, Mawson Lakes (AU); Michael Schrefl, Altenberg Bei Linz (AT)

(73) Assignee: UNIVERSITY OF SOUTH AUSTRALIA (AU)

( * ) Notice: Subject to any disclaimer, the term of this patent is extended or adjusted under 35 U.S.C. 154(b) by 322 days.

(21) Appl. No.: 14/896,078

(22) PCT Filed: Jun. 5, 2014

(86) PCT No.: PCT/AU2014/000587
§ 371 (c)(1),
(2) Date: Dec. 4, 2015

(87) PCT Pub. No.: WO2014/194365
PCT Pub. Date: Dec. 11, 2014

(65) Prior Publication Data
US 2016/0132838 A1 May 12, 2016

(30) Foreign Application Priority Data

Jun. 7, 2013 (AU) .................................. 2013902074

(51) Int. Cl.
*G06Q 10/00* (2012.01)
*G06F 8/51* (2018.01)
(Continued)

(52) U.S. Cl.
CPC ............... *G06Q 10/20* (2013.01); *G06F 8/51* (2013.01); *G06Q 10/00* (2013.01); *G06Q 10/08* (2013.01); *G06Q 10/087* (2013.01); *G06Q 50/08* (2013.01)

(58) Field of Classification Search
CPC ...... G06Q 10/10; G06F 17/30038; G06F 8/24
See application file for complete search history.

(56) References Cited

U.S. PATENT DOCUMENTS

2006/0101376 A1  5/2006 Gutz et al.
2006/0130011 A1* 6/2006 Cornell ..................... G06F 8/10
                                                                    717/136
(Continued)

OTHER PUBLICATIONS

Meservy et al. "Transforming Software Development: An MDA Road Map". 2005. IEEE. (Year: 2005).*
(Continued)

*Primary Examiner* — Lewis A Bullock, Jr.
*Assistant Examiner* — Gilles R Kepnang
(74) *Attorney, Agent, or Firm* — Sheridan Ross P.C.

(57) ABSTRACT

A computational method for performing a data transformation process for use in Engineering Asset Management on an industrial scale is described, The method and associated integration environment includes a transformation engine or module to map model elements and data items from a first information system, for example a procurement and construction database that records the thousands of individual components used to construct an industrial site, to a second information system. Such as an operation and maintenance database. The method uses a model transformation user interface using hierarchically linked layers to allow users to create, view and modify the transformation specification, as well as element terms and element relationships which define a transformation specification, without having to write the underlying code that performs the transformation.

19 Claims, 10 Drawing Sheets

(51) Int. Cl.
*G06Q 10/08* (2012.01)
*G06Q 50/08* (2012.01)

(56) References Cited

U.S. PATENT DOCUMENTS

| | | | |
|---|---|---|---|
| 2007/0130180 A1 | 6/2007 | Rasmussen | |
| 2007/0168374 A1* | 7/2007 | Bourne | G06F 17/30038 |
| 2008/0228521 A1* | 9/2008 | Wilmering | G06Q 10/00 |
| | | | 705/2 |
| 2009/0007084 A1* | 1/2009 | Conallen | G06F 8/35 |
| | | | 717/146 |
| 2009/0150854 A1* | 6/2009 | Elaasar | G06F 8/35 |
| | | | 717/104 |
| 2009/0228863 A1* | 9/2009 | Nigul | G06F 8/73 |
| | | | 717/104 |
| 2010/0064275 A1* | 3/2010 | Akkiraju | G06F 8/35 |
| | | | 717/104 |
| 2010/0083374 A1* | 4/2010 | Schmitlin | G06Q 10/10 |
| | | | 726/21 |
| 2011/0270595 A1* | 11/2011 | Salehi | G06Q 10/00 |
| | | | 703/6 |
| 2012/0042299 A1* | 2/2012 | Perrin | G06F 8/10 |
| | | | 717/104 |
| 2012/0102451 A1* | 4/2012 | Kulkarni | G06F 8/24 |
| | | | 717/102 |
| 2013/0332240 A1* | 12/2013 | Patri | G06Q 10/06 |
| | | | 705/7.36 |
| 2016/0062753 A1* | 3/2016 | Champagne | G06F 8/51 |
| | | | 717/137 |

OTHER PUBLICATIONS

International Search Report and Written Opinion prepared by the Australian Patent Office dated Jun. 20, 2014, for International Application No. PCT/AU2014/000587.

Berger, S. et al. "*Metamodel-Based Information Integration at Industrial Scale*", Model Driven Engineering Languages and Systems (MODELS 2010), Lecture Notes in Computer Science, vol. 6395, 2010, pp. 153-167.

Grossmann, G. et al. "An Architectural Concept for the CIEAM Enterprise Bus"; Chapter in Engineering Asset Management and Infrastructure Sustainability, Springer London, p. 251-261 (2012).

Wimmer, M. et al. "Fact or Fiction—Reuse in Rule-Based Model-to-Model Transformation Languages"; Chapter in Theory and Practice of Model Transformations, Springer Berlin Heidelberg, p. 280-295 (2012).

* cited by examiner

METHOD AND SYSTEM FOR INFORMATION INTEGRATION IN INDUSTRIAL SYSTEMS

CROSS REFERENCE TO RELATED APPLICATIONS

This application is a national stage application under 35 U.S.C. 371 and claims the benefit of PCT Application No. PCT/AU2014/000587 having an international filing date of Jun. 5, 2014, which designated the United States, which PCT application claimed the benefit of Australian Patent Application No. 2013902074 filed Jun. 7, 2013, the disclosures of each of which are incorporated herein by reference.

TECHNICAL FIELD

The present invention relates to information integration. In a particular form the present invention relates to exchange of information between information systems for engineering asset management of industrial systems.

BACKGROUND

Engineering Asset Management, that is the management and administration of large-scale industrial systems remains a challenging exercise. Industrial plants are extremely complex comprising many thousands, if not hundreds of thousands of parts that must work together to perform often automatized processes and operations. To assist in the design, maintenance and management of industrial parts, it is essential that plant operators maintain virtual models that accurately reflect the physical plant. These virtual models typically comprise hierarchically organised model elements. Not surprisingly these virtual models are hugely complex as they aim to describe and track both equipment and the individual components over the lifecycle of the physical plant such as tracing the fate of individual nuts and bolts over the lifecycle of an oil drilling rig. Due to the size and complexity these virtual models are often independently designed, constructed and maintained by different domains such as Engineering Procurement and Construction (EPC), and operation and maintenance. Frequently there is a need to exchange large quantities of data across domain boundaries of business-oriented and engineering-oriented systems. Further domain specific information systems may comprise many independently developed and maintained sub systems which are also required to exchange data.

For example, oil and gas processing companies are engaged in global networks for the engineering, procurement, construction and maintenance of their plants and assets (e.g., assembly of drilling platforms or refineries). These activities constantly require large-scale exchange of data between different sections of a company, between business partners in a venture, and between clients and providers in terms of equipment and services. One of the most important applications in the so-called Engineering Asset Management (EAM) domain is to exploit lifecycle data of industrial plants for more accurate planning and management of maintenance actions, thus saving substantial costs. Despite considerable efforts towards standardization of plant data management and exchange in the oil and gas industry, significant interoperability problems exist.

Different parts of the industry use competing standards for representing engineering assets—ISO 15926, and the Machinery Information Management Open Systems Alliance (MIMOSA) Open Systems Architecture for Enterprise Application Integration (OSA-EAI). Both standards facilitate the integration and exchange of heterogeneous information on industrial plants. The same holds for the lesser known ISO 14224 standard on maintenance systems descriptions. Engineering companies (i.e., equipment producers, design and CAD companies such as Intergraph or Bechtel) generally use ISO 15926. With certain exceptions, the maintenance providers and control systems companies (e.g., IBM/MAXIMO, Microsoft, Rockwell Automation, Emerson, and Yokogawa) use MIMOSA. Both sides have established a significant code base and market share-driven vested interest in maintaining a separate platform, even though any company would profit from superior interoperability.

The ISO 15926 standard defines an information model and exchange infrastructure for industrial plants. Although the title of the standard emphasizes the oil and gas industry, the data model is generic and allows representing assemble and lifecycle data of all kids of industrial plants. Formally, the data model of ISO 15926 is based on set theory and first order logic, specified in the EXPRESS modelling language. The model is also nominally defined in the OWL Semantic Web language, although its expressivity is insufficient to fully capture technical knowledge about the domain. As a result, OWL is mainly used for simple type consistency checks. The official ISO 15926 repository uses RDF (Resource Description Framework) as the internal representation.

MIMOSA OSA-EAI is rather specified in UML as an object-oriented information model which corresponds to the MIMOSA relational schema (CRIS). Basically OSA-EAI is an implementation of the ISO 13374 functional specification. This means that OSA-EAI complements the functionality blocks of the ISO 13374 standard with interface methods. The MIMOSA object and relational models are separately maintained but the object model is gaining in relative importance. Both ISO 15926 and MIMOSA nominally support XML as an interchange format. Many of the XML formats of ISO 15926 vendors are mutually non-interoperable, though, as the limited use of semantic annotations leaves too much flexibility in the implementation of the standard.

Thus integration of information within industrial systems remains a challenging task. As a result of the use of different data specifications or data standards two independently developed systems will typically find that their data structures are mutually inconsistent and thus non-interoperable. Whilst questions of low-level encoding and data types have become less of an issue with the rise of XML and its derivatives for data exchange, this has been offset by the higher complexity resulting from increased modelling power which has opened the interoperability gap even wider. As a result the transformation and exchange of data (ie data integration) is an ever-present issue. Whilst tools such as IBM Websphere or SAP Netweaver present an XML-syntax, service orientated architecture (SOA) based interface to the world to assist, the structure and meaning of data still needs to be manually adjusted by developers ensuring that the right data structures are exchanged and transformed at the right time. Whilst some tools exist for performing schema matching (eg MapForce) these can typically only accommodate very limited amounts of heterogeneity and thus in most EAM cases manual mappings are performed. However, this step of manually matching data structures from one data specification to another data specification is extremely time consuming and frequently quite specific to the specific systems or data exchange task (ie the transformation is not reusable). Some model driven engineering approaches have been developed to try and address these issues. One complex model based approach uses a large number of different model groups including semantic annotations, reasoning about Quality of Service requirements, ontology-based models in Resource Description Framework (RDF), Object Constraint Language (OCL) and process algebra, and an according family of supporting tools. However this approach is considerably complex and is still insufficient to completely handle real world conflict situations, and inevitably developers are required to fall back to manual mappings.

There is thus a need to provide computer implemented methods, tools and systems to facilitate mapping and exchange of model elements from information systems with different (ie heterogeneous) data specifications.

SUMMARY

According to a first aspect of the invention, there is provided a computer implemented method for generating a computer executable transformation engine for transforming a first set of model elements in a first information system to second set of model elements in a second information system, the method comprising:
providing a model transformation user interface for displaying a visual representation of a model transformation specification to a user, the model transformation specification comprising:
a plurality of user definable element terms;
a plurality of user definable element relationships, each element relationship relating two or more element terms;
at least three user definable hierarchically linked layers comprising a lowest layer, one or more intermediate layers, and a highest layer,
wherein each layer comprises one or more user definable element terms, and zero or more element relationships, and
each of the element terms and each of the element relationships in the highest layer are instances of themselves, and
each of the element terms and each of the element relationships in an intermediate layer is an instance of a group of one or more element terms and one or more element relationships defined in the next highest layer, and
the lowest layer is a transformation execution layer which receives the first set of model elements and transforms the first set of model elements into the second set of model elements using at least one instance of a group of one or more element terms and one or more element relationships defined in the next highest layer; and
wherein each element term, each element relationship, and each layer has an associated visual representation; and
receiving one or more user inputs for creating or modifying an element term or an element relationship within a layer of the model transformation specification, wherein the creation or modification of an element term or an element relationship in a layer is made immediately visible to all lower layers; and
wherein in use, the model transformation specification is used to generate a computer executable transformation engine which receives the first set of model elements from the first information system, and sends the second set of model elements to the second information system.

In one form, the method further comprises generating the computer executable transformation engine.

In one form, the method further comprises receiving one or more user inputs for creating an element term in a new layer above the highest layer, wherein the created element term is made immediately visible to all lower layers.

In one form, the user interface further comprises a model transformation library comprising a plurality of computer executable modules for implementing the model transformation specification, and the transformation engine is generated using the model transformation library.

In a further form, the plurality of computer modules comprises code for implementing each of the plurality of terms and each of the plurality of relationships, and the step of receiving one or more user inputs for creating or modifying an element term or an element relationship within a layer of the model transformation specification further comprises immediately updating the plurality of computer executable modules.

In one form, the model transformation user interface is implemented in a first computing language, and the method further comprises generating one or more secondary model transformation user interfaces that display a visual representation of the model transformation specification to a user, and allowing a user to create and modify an element term or an element relationship within the at least the lowest two layers of the model transformation specification, but not the highest layer, and to generate a computer executable transformation engine.

In one form, the model transformation user interface is implemented in a first computing language, and the one or more secondary model transformation user interfaces are generated in a second computing language.

In one form, the model transformation user interface and the one or more secondary model transformation user interfaces are in communication with a common model transformation library comprising a plurality of computer executable modules for implementing the model transformation specification, and the transformation engine is generated using the model transformation library.

In one form, the first information system stores model elements according to a first data specification, and the second information system stores model elements according to a second data specification, and the first data specification is a MIMOSA OSA-EAI compliant data specification and the second data specification is a ISO 15926 compliant data specification, or the second data specification is a MIMOSA OSA-EAI compliant data specification and the first data specification respectively is a ISO 15926 compliant data specification.

In one form, the model transformation user interface is implemented in an object orientated language. This may be a language selected from the group including Ruby, C#, Java, or Smalltalk.

According to a further aspect of the invention, there is provided a transformation apparatus for transforming a first set transforming a first set of model elements in a first information system to second set of model elements in a second information system, the apparatus comprising:
at least one processor; and
at least one memory, the memory comprising:
a model transformation user interface module for displaying a visual representation of a model transformation specification to a user, the model transformation specification comprising:
a plurality of user definable element terms;
a plurality of user definable element relationships, each element relationship relating two or more element terms;
at least three user definable hierarchically linked layers comprising a lowest layer, one or more intermediate layers, and a highest layer,
wherein each layer comprises one or more user definable element terms, and zero or more element relationships, and
each of the element terms and each of the element relationships in the highest layer are instances of themselves, and
each of the element terms and each of the element relationships in an intermediate layer is an instance of a group of one or more element terms and one or more element relationships defined in the next highest layer, and
the lowest layer is a transformation execution layer which receives the first set of model elements and transforms the first set of model elements into the second set of model elements using at least one instance of a group of one or more element terms and one or more element relationships defined in the next highest layer; and
wherein each element term, each element relationship, and each layer has an associated visual representation; and
the model transformation user interface receives one or more user inputs for creating or modifying an element tam or an element relationship within a layer of the model transformation specification, and wherein the creation or modification of an element term or an element relationship in a layer is made immediately visible to all lower layers; and
a transformation engine, wherein the transformation engine is configured to receive the first set of model elements from the first information system, transform the first set of model elements using the model transformation specification, and sending the second set of model elements to the second information system.

According to a further aspect of the invention, there is provided a computer program product comprising a computer readable medium containing instructions for causing a computer to perform the method of the first aspect.

According to a further aspect of the invention, there is provided a transformation apparatus for transforming a first set of model elements in a first information system to second set of model elements in a second information system, the method apparatus comprising:
at least one processor; and
at least one memory comprising instructions for causing the at least one processor to perform the method of the first aspect.

According to a further aspect of the invention, there is provided a model transformation library comprising as plurality of computer executable modules for implementing a model transformation specification, wherein the model transformation specification comprises:
a plurality of user definable element terms;
a plurality of user definable element relationships, each element relationship relating two or more element terms;
at least three user definable hierarchically linked layers comprising a lowest layer, one or more intermediate layers, and a highest layer, wherein each layer comprises one or more user definable element terms, and zero or more element relationships, and each of the element terms and each of the element relationships in the highest layer are instances of themselves, and each of the element terms and each of the element relationships in an intermediate layer is an instance of a group of one or more element terms and one or more element relationships defined in the next highest layer, and the lowest layer is a transformation execution layer which receives the first set of model elements and transforms the first set of model elements into the second set of model elements using at least one instance of a group of one or more element terms and one or more element relationships defined in the next highest layer.

In one form, the model transformation library is in communication with a model transformation user interface, and the computer executable modules are updated in response the creation or modification of an element term or an element relationship within a layer in the model specification, and all modules associated with lower layers are immediately updated to reflect the creation or modification.

According to a further aspect of the invention, there is provided a model transformation engine comprising the model transformation library.

BRIEF DESCRIPTION OF DRAWINGS

A preferred embodiment of the present invention will be discussed with reference to the accompanying drawings wherein.

DESCRIPTION OF EMBODIMENTS

An embodiment of a method for generating a model transformation specification, and an integration environment (i.e. software tool) which implements the method which can be used for performing a data transformation process for use in performing Engineering Asset Management will now be described. The method and associated integration environment includes a transformation engine (or transformation module) to map model elements (or data items) from a first information system to a second information system. In most embodiments, transformation specifications will be reversible, such that defining a mapping from a first system to a second system will also allow mapping from the second system to the first systems. In some embodiments, mapping specifications may be one way mappings. In some embodiments, the integration environment comprises a computer readable model transformation library comprising computer executable modules for implementing one or more transformation specifications for use by the transformation engine to performing the mapping of heterogeneous data structures (ie source and target models). The method uses a model transformation user interface (ie development environment) to allow users to define the transformation specification to create, view and modify the transformation specification, as well as element terms and element relationships which define a transformation specification.

Figure 1:
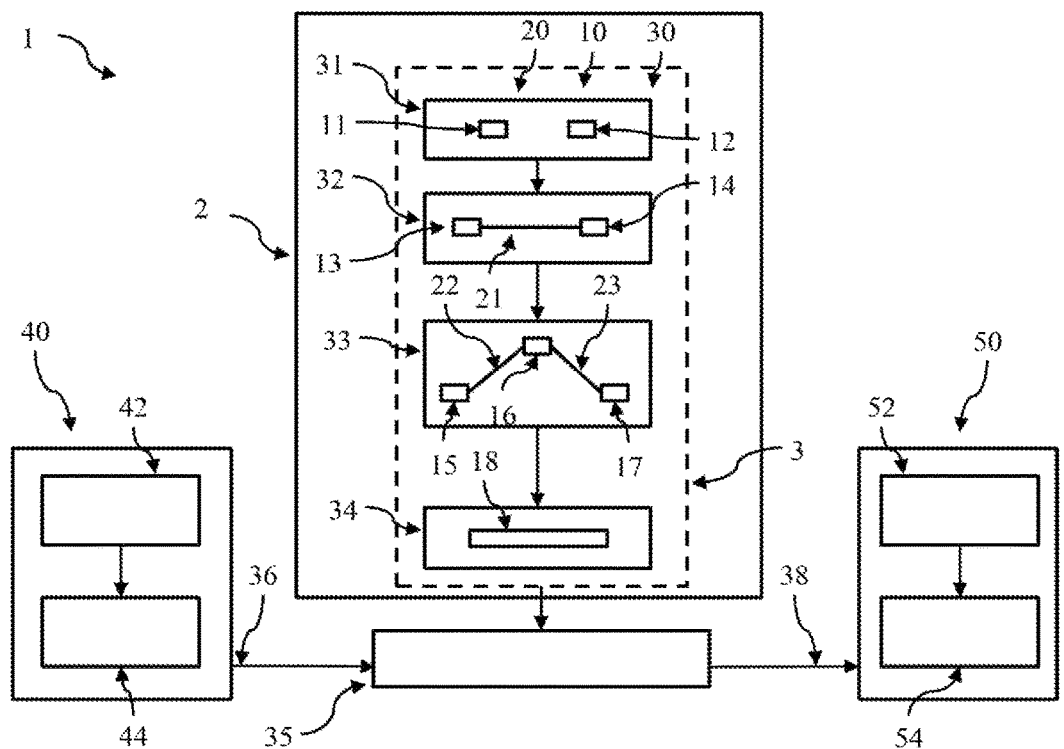
FIG. 1 is a schematic diagram of a data transformation process according to an embodiment.

FIG. 1 is a schematic diagram of a data transformation process 1 comprising a model transformation user interface 2 which displays a visual representation of a model transformation specification 3 according to an embodiment. The model transformation specification 3 is used by a transformation engine 35 for transforming a first set of model elements 44 in a first information system 40 to second set of model elements 54 in a second information system 50. The first information system 40 stores model elements 44 according to a hierarchically organised model which will be referred to as a first data specification 42, and the second information system 50 stores model elements 54 according to a another hierarchically organised model which will be referred to as second data specification 52. For example, the first data specification may be a MIMOSA OSA-EAI compliant data specification and the second data specification may be an ISO 15926 compliant data specification (or vice versa). The two models are heterogeneous models. That is, the model of a physical apparatus in the first information will, at least in some cases, if not many or all cases, be different to the model of the same apparatus in the second information system. Whilst similar information may be captured in both models, a user must create a model transformation to map the-models (e.g., link the underlying data structures and data items are not 'identical and so generally cannot be directly mapped.

The model transformation specification 3 comprises a plurality of element terms 10, a plurality of element relationships 20 which link two or more terms, and at least three hierarchically linked layers 30. Element terms and element relationships will also be referred to as terms and relationships respectively. The hierarchically linked layers are abstraction layers and comprise a lowest layer, one or more intermediate layers, and a highest layer. Each abstraction layer comprises one or more user definable element terms, and zero or more element relationships. In the embodiment shown in FIG. 1, there is a highest layer 31, an intermediate layers 32, 33 and a lowest layer 34. The highest layer 31 includes two terms 11 and 12. The next intermediate layer 32 includes two terms 13 and 14 which are linked by relationship 21. The next intermediate layer 33 includes three terms 15 16 17, with terms 15 and 16 linked by relationship 22 and terms 16 and 17 linked by relationship 23. The lowest layer 34 includes a single term 18 (e.g., the transformation term).

Each of the element terms and each of the element relationships in the highest layer are instances of themselves. Each of the element terms and each of the element relationships in an intermediate layer is an instance of a group of one or more element terms and one or more element relationships defined in the next highest layer. These groupings effectively define a class in object orientated methodology. Each intermediate layer thus contains element terms and relationships that define classes for use in lower layers and are themselves instances of a class defined in a higher layer. The lowest layer is a transformation execution layer which receives the first set of model elements and transforms the first set of model elements into the second set of model elements. This layer will typically be a single transformation element which is an instance of a transformation specification defined in the next level above and that consumes the source model and produces the target model.

The use of the model transformation user interface allows a developer to define a transformation specification without having to write the underlying code. They can visually interact with element terms, relationships and groups (classes) and the user interface will generate the associate code to implement these definitions and relationships. One or more model transformation specifications 2 can be stored in or provided in the form of an electronic library, referred to as a model transformation library, which can be used by the transformation engine 35. The model transformation library will typically comprises a library of computer modules, with each computer module related to a term or group of terms and relationships (ie a class) in a layer. Thus, the library may store executable code capturing the functionality of a class defined in a high layer, as well as operator classes which utilise instances of classes defined in higher layers. The library may be a class library storing language definitions, classes and subclasses defined in the different layers of the model. The transformation engine is used to build (or instantiate) the executable code for a specific transformation 34 to transform model elements 44 stored in a first (source) information system 40 according to a first data specification 42 to model elements 54 stored in a second (target) information system 50 according to a second data specification 52. In some embodiments, the model transformation library can be made available to other transformation developers to allow development and implementation of computer code for performing specific transformations. This library may be stored in a format such that the development and implementation is performed in another computing language to that used to implement the modelling user interface use to build the library.

Each element term 10, each element relationship 20, and each layer 30 has an associated visual representation in the model transformation user interface. The element term, element relationship and layer definitions can be created, viewed or modified in a user interface, which may include graphical editors and text editors, and the definitions can be stored as computer codes. This allows a user to create terms, relationships and layers, as well as edit or modify existing terms relationships and layers, and visualise the relationships to facilitate building transformations. The computer codes can be converted (eg compiled or interpreted) into computer executable instructions including machine specific instructions or platform independent byte-code for subsequent conversion into machine specific instructions just prior to execution. The computer executable instructions can be stored as a library. This can be loaded and accessed by applications, or made available to other applications such as via a web service.

Further, the system is configured such that the creation or modification of an element term or an element relationship in a layer is made immediately visible to all lower layers. That is if a user determines another term, or even another layer is needed, this can be term can be created, along with any relationships and default values, and this change will be propagated throughout the system. For example, an on may be added to the palette of icons for the lower layer allowing an instance of the added element term or group to be added to the layer. The user may also create or modify term, relationship and layer definitions in text editors and these definitions may be loaded and saved by the user interface, and visual representations generated for each loaded terms, relationship or layer. Further, as terms, relationships and layers are created or modified, supporting computer code is created and/or updated in the transformation model library. That is the system is configured so that changes to terms, relationship, groups (eg classes) or a layer are immediately available to modules in the transformation library. For example, if a first module represents a first term in a first layer, and a second module represents a second term in a lower layer which includes an instance the first term, then a change to the first term such as adding a new relationship to a third term, results in the code for the second terms being immediately updated to implement this change. One suitable implementation language is Smalltalk, which is a fully object orientated language which facilitates implementation of this feature. Other object orientated languages can also be used (eg Ruby, Lisp, Objective C, C++, C#, Java). The ease with which this feature can be implemented will depend upon how pure or compliant the language is with object orientated principles.

Figure 2:
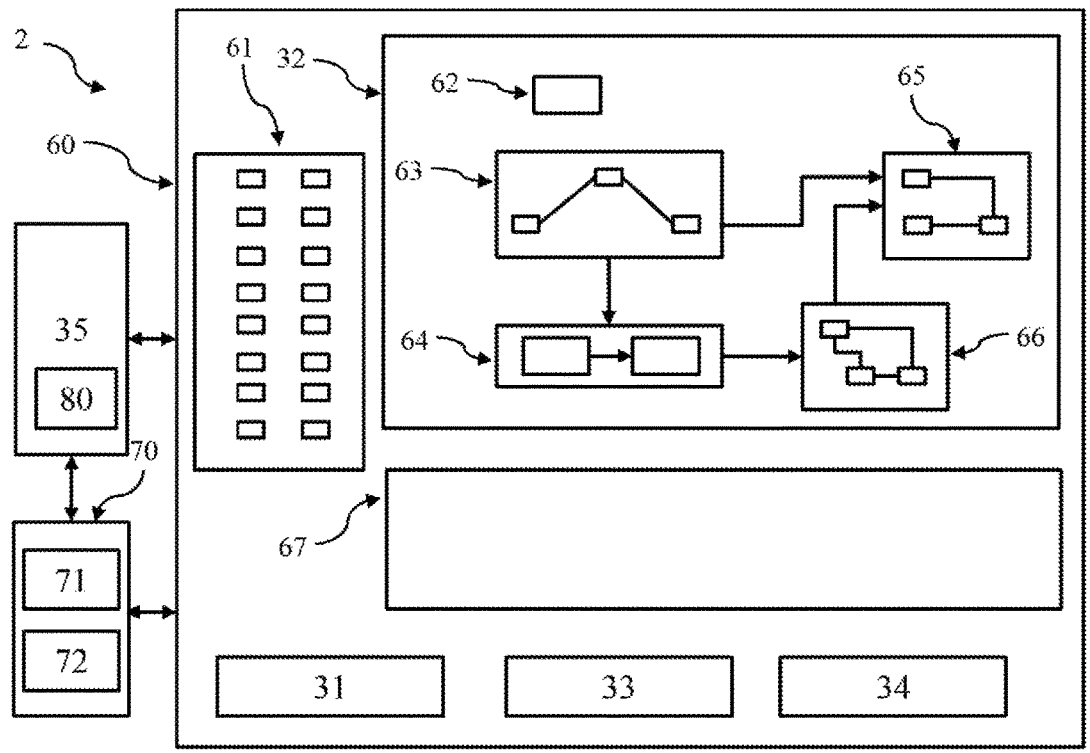
FIG. 2 is to schematic diagram of as model transformation user interface according to an embodiment.

FIG. 2 is a schematic diagram of a model transformation user interface 2 according to an embodiment. The user interface includes a graphical user interface window 60 which includes a palette 61 of selectable icons, layer windows 31 32 33 34, of which layer 32 is active, and a text input window 68. Active layer 32 includes element terms and element relationships arranged into groups 62 63 64 65. The palette includes visual representations of terms and or group of terms and relationships (eg a class) to allow instances of these objects to be added to the active layer. Similarly icons can be provided to allow a user to define a new relationship by linking terms. Additional icons can be added to create a new layer, delete an object, and provide additional functionality (eg saving and loading of files, changing display properties, etc). A text input window is provided which can display and allow editing of properties of the active visual object (eg term, relationship or layer). The model transformation user interface is implemented by a computing apparatus 70 which includes at least one processor 71 and at least one memory 72. The computing apparatus and model transformation user interface are in communication with the transformation library 80 that creates and stores code or modules for implementing the model specification defined using the model transformation user interface, and which is used by the transformation engine 35.

Current approaches on information integration lack sufficient flexibility to account for evolving models and/or changing information requirements. In particular, most current tools cover only partial aspects of the integration process. Therefore, users have to acquaint themselves with several different tools in order to deal with both the schema- and data-specific aspects of mappings between the models used in heterogeneous information systems. The method illustrated in FIGS. 1 and 2 uses a multi-layered metamodel approach to tackle the integration problem at a higher level of abstraction, and increases the flexibility of mappings through the use of reusable transformation specifications (also referred to as mapping modules or mapping templates). This means that integration decisions are made for generic small fragments of models with a transformation specification defining conversion operators at the meta-model level, typically for a single conceptual entity of the underlying domain model (e.g., a fuel pump). Once the user has specified how to convert a particular entity among different meta-models (eg from MIMOSA OSA-EAI to ISO 15926), this mapping can be stored in a library and reused as a template for all model fragments that represent the same entity. In this way more complex transformations can be built. Further the meta-model can be multi layered to provide even greater flexibility and reusability as multi-layered meta-models are easier to evolve and maintain over time.

A multi layered metamodel-based approach has been developed and implemented in which the transformation engine is built as an extension of the open source DoME metamodelling tool, which generates interactive model drawing editors based on a metamodel specification. In particular the metamodalling tool has been extended to support development of multi-layered meta-models (ie model transformation specifications). The underlying Smalltalk platform guarantees dynamic compilation and execution of mappings as well as binary compatibility across all common deployment environments. The implementation provides wrappers to relational databases (ODBC), XML, Web services (WSDL/SOAP) and a range of proprietary environments (e.g., SAP RFC, MS Access).

Figure 3:
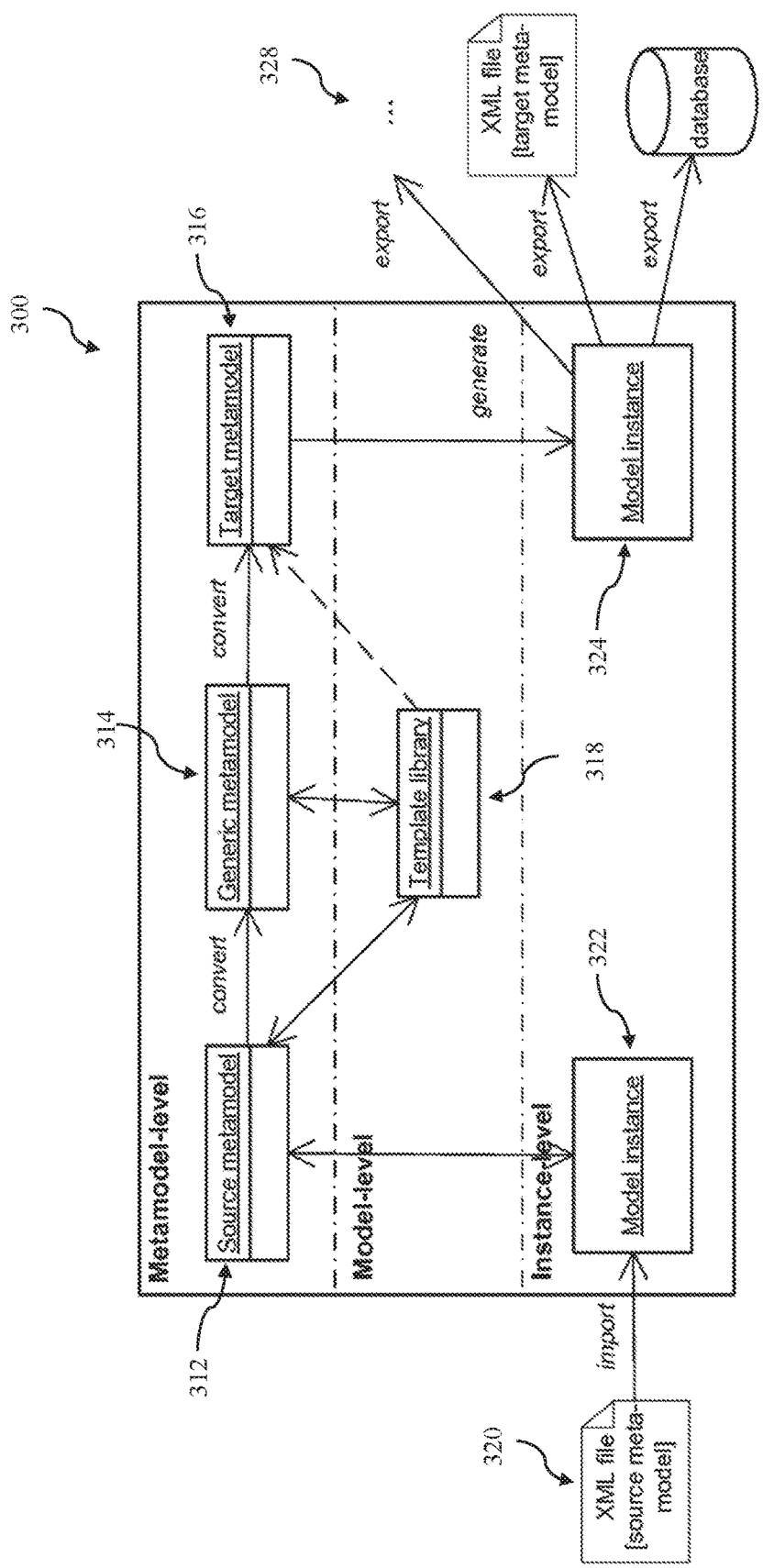
FIG. 3 is a schematic diagram of a transformation engine according to an embodiment.

FIG. 3 is a schematic diagram 300 of a transformation engine 310 according to an embodiment. Once a model specification has been defined using a model transformation user interface, the only task necessary for the application user is to import a source file 320 whereupon the tool automatically converts the source model and data (the model instance 322) to a semantically equivalent target representation (model instance 324) which is exported to a target file or database 328. Conceptually, the model transformation specification is a generic metamodel 314, and the source metamodel 312 and target metamodels 316 are sub-metamodels of this generic metamodel 314. Thus the transformation specification defines how to convert to and from the source metamodel 312 and the generic metamodel 314, and how to convert to and from the target metamodel 316 and the generic metamodel 314. The model transformation specification is embodied in executable modules in model transformation library 318, also referred to as a template library or as mapping templates.

The flexibility of this metamodel-based approach originates from combining both, schema and instance information in the mapping templates. Intuitively, the mapped entities and their properties serve as arguments of the template, which enables the conversion of data chunks across modelling levels. Given the different rationale behind the various EAM standards in use, such a degree of flexibility is necessary, particularly for ISO 15926 which often blurs the schema and instance levels. Semantically equivalent data often reside at different modelling levels across the standards property values of OSA-EAI objects commonly map to concepts called relations of ISO 15926).

The metamodel architecture depicted in FIG. 3 utilizes mapping templates with instance information to derive better transformations of source models to the target representation. Metamodel-based information integration offers several advantages which help reducing the mapping effort among heterogeneous metamodels. First, mapping operators introduced at the metamodel level are generally available for all mapping templates defined at the model level. Secondly, the template library allows reuse of mapping fragments between interrelated metamodels. Thus, domain specific integration knowledge is stored once at some central repository, independent of any particular application. Thirdly, mapping templates are interpreted without any "direction" to augment reusability and fourthly the transformation process is transparent for the application users. Further, and as described below, the metamodel can be further abstracted as a multi-layer (or multi-level) metamodel using a multi-layered model transformation specification in which element terms and element relationships can be defined, modified and edited to provide even greater reuse and flexibility.

It is noted that essentially all descriptions within the box in FIG. 3 correspond to the Platform Independent Model (PIM) level of the modelling domain architecture approach. They abstract from the syntax and low-level application code, and the model semantics are wholly expressed in terms of its structure. The differences captured by the metamodel mapping are differences in the organization of the content, not a result of the platform used. For instance, we can split an address into a street name and a number regardless of the underlying model (relational, XML-based, or object-oriented). These mappings capture modelling differences, not platform differences. The actual PIM-to-PSM (platform specific model) mapping is therefore restricted to the import and export functions (which includes the actual access to the systems being mapped).

Not all information described at this PIM level is ontologically equal. While the information captured in the different metamodels is, by necessity, to some degree domain dependent, this term has to be understood loosely. For example, the higher level concepts of the ISO 15926 model follow lines of distinction such as that between physical and nonphysical objects, a rather abstract ontological difference. In contrast, the mapping templates need to examine specific aspects of the domains involved in the mapping and place them in relation to each other. Therefore we refer to them as Scenario Specific PIMs (SSPIMs), whereas the higher levels are Scenario Independent PIMs (SIPIMs). Some authors use MDA terminology in the sense that a high level formal business process model is a Computation Independent Model (CIM). From the traditional viewpoint, which we follow, a CIM is not captured by tools because it is computation independent, and supporting it with a tool requires at least identifying the formal semantics of what one wants to represent—in other words, defining a PIM for the CIM.

We will now elaborate on the concepts behind our multi-layer metamodel-based integration approach for the Engineering Asset Management domain discussed previously. We also provide an example embodiment of how to apply the methodology in order to establish a library of mapping templates between the ISO 15926 and MIMOSA OSA-EAI standards.

The multi-layer metamodel defines the fundamental concepts of the to-be-integrated data. The generic multi-layer metamodel (includes the topmost abstraction layer and thus has to be both, sufficiently expressive to satisfy the information needs of all applications and users, and generic enough to represent all semantically interrelated sub-metamodels. The model transformation user interface allows a developer to define, and importantly modify the model transformation specification, for example to provide flexibility in response to an integration issue or a change to a model. New terms and layers can be defined and the method ensures that changes become available throughout all sub-layers.

The multi-layer metamodel provides a static and a dynamic perspective on the application domain it describes. On the one hand, the entities, attributes and relationships of the multi-layer metamodel represent the static viewpoint on the application domain. Furthermore, the static view comprises all sub-metamodels which express similar semantics and are therefore connected to the multi-layer metamodel. On the other hand, the mapping operators between the sub- and multi-layer metamodels as well as the conversion operators within particular metamodels specify the dynamic viewpoint on the application domain. Intuitively, the dynamic view describes in detail the options available for converting data between the different metamodels while preserving the original semantics of the data. As will be outlined below, the metamodel is a multi-layered (multi-level) model allowing definition and modification of the model element terms and model element relationships used to generate operator specifications (eg operator classes).

Figure 4:
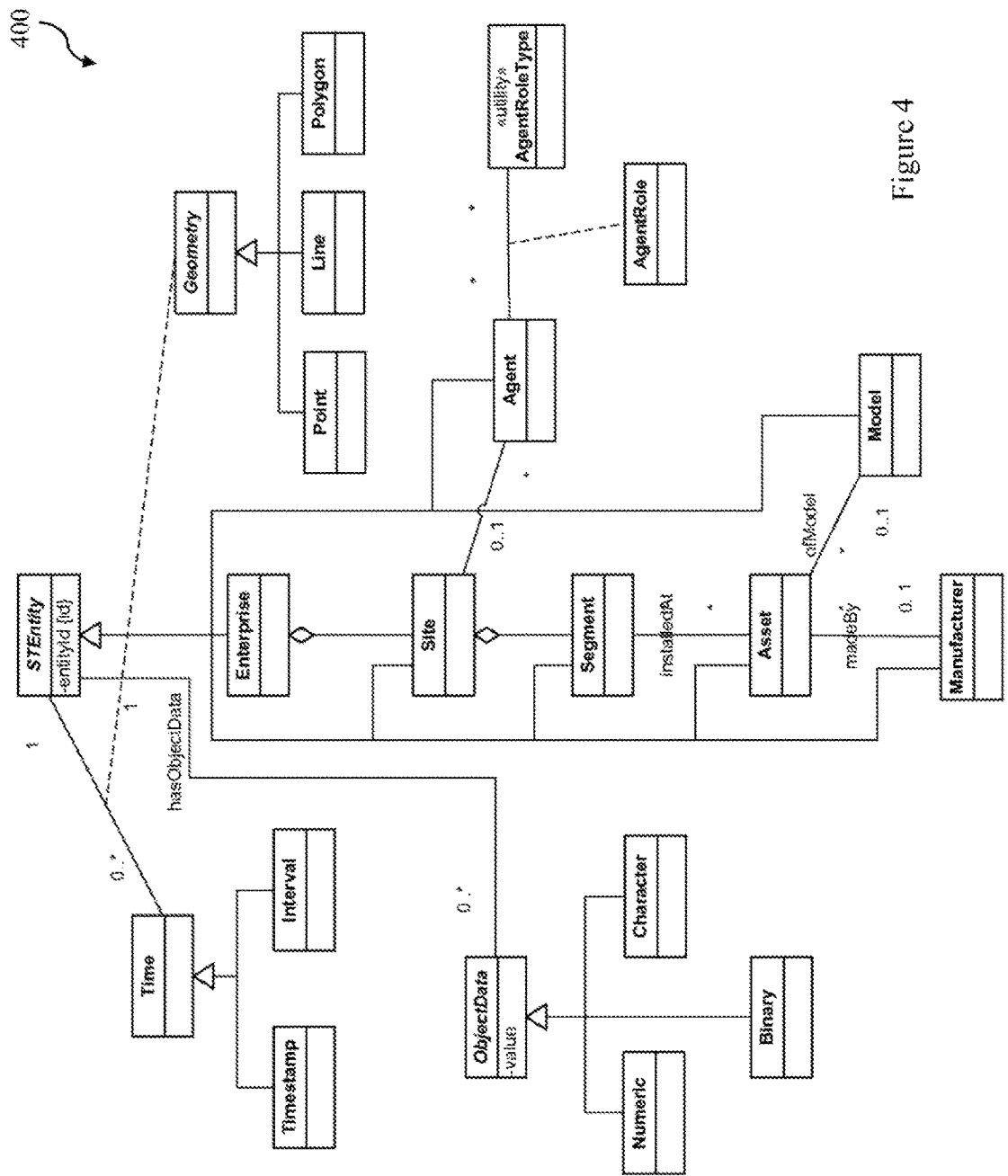
FIG. 4 is a schematic diagram of a generic meta-model for use in an engineering asset management (EAM) domain according to an embodiment.

FIG. 4 shows a schematic diagram 400 of a generic meta-model for use in an engineering asset management (EAM) domain. FIG. 4 is a UML class diagram and illustrates a (simplified) static view of the generic metamodel developed for that application domain. Note that the generic metamodel is an object-oriented spatio-temporal data model. Thus, the multi-layer metamodel is generic enough to represent both, the 4D data model of ISO 15926 (i.e., 3-dimensional space plus time), and the object identity principle used in the MIMOSA OSA-EAI core data model. In particular, the Enterprise, Site and Segment metaclasses reflect the hierarchical composition of industrial plants from smaller physical or logical units and subunits. In turn, Asset, Model and Manufacturer allow modelling the exact physical structure of Segments, the smallest subunits of plants. Finally, ObjectData and its subclasses provide a generic mechanism for representing attributes or other pieces of information not captured by any of the top-level metaclasses.

Figure 5:
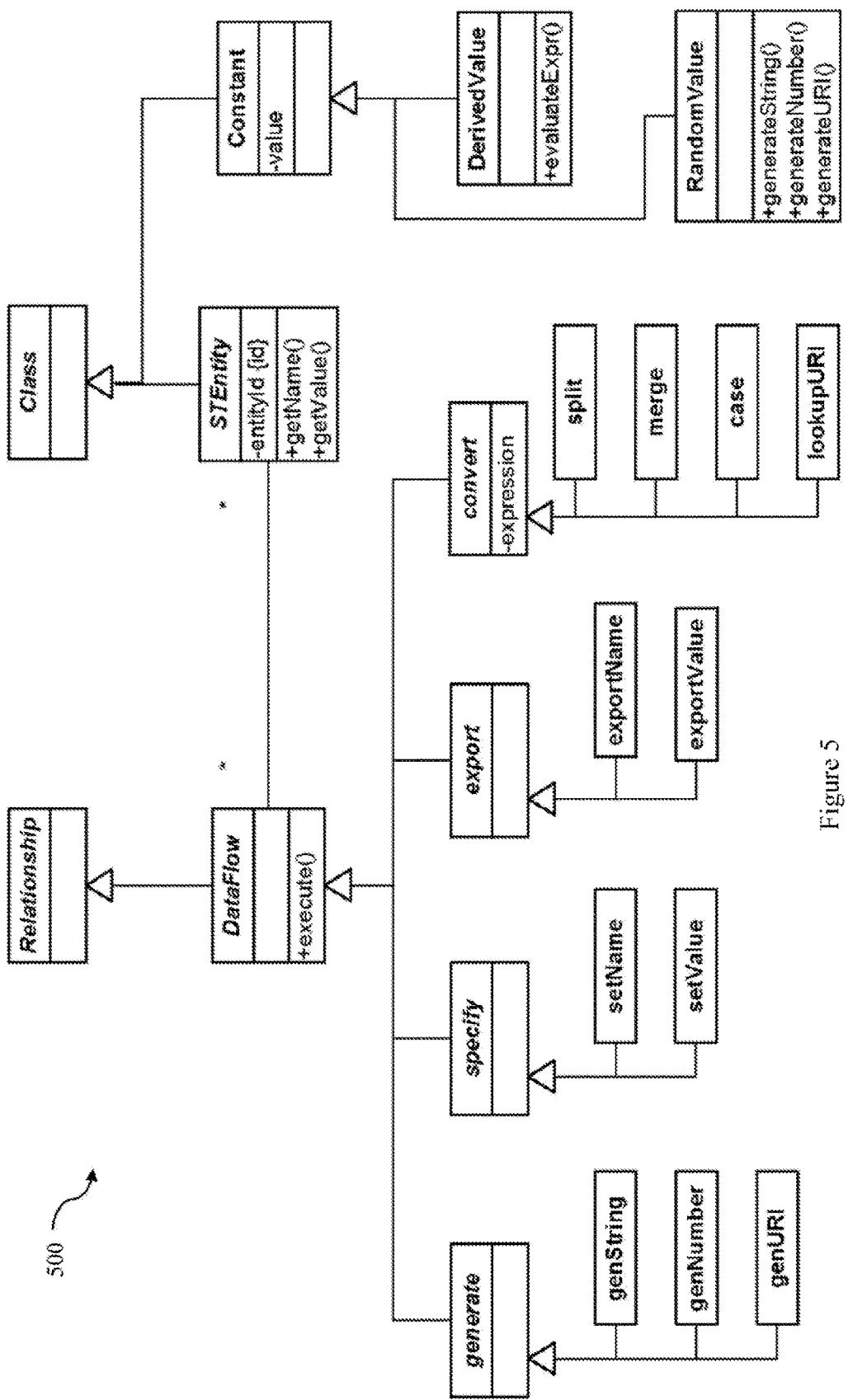
FIG. 5 is a schematic diagram of mapping operator for the generic meta-model shown in FIG. 4.

FIG. 5 is a schematic diagram 500 of mapping operators for the generic meta-model shown in FIG. 4, and shows the dynamic view of the generic metamodel. Most conversion operators are represented as relationships, but we also need the Constant, DerivedValue and RandomValue classes to allow for completion of source model data in mapping templates with fixed respectively calculated values. In particular, the dynamic part of our generic EAM metamodel comprises four families of DataFlow operators (generate, specify, export, convert), plus the aforementioned Constant operator hierarchy. The generate operators read the result of a RandomValue operator, and assign the result to STEntity objects of the generic top metamodel (see FIG. 4). In contrast, the specify and export operator families read and write object names (setName, exportName) or attribute values (setValue, exportValue) from and to entities of sub-metamodels, respectively. Finally, the convert family provides more complex operations, like splitting an object name at some position (e.g., split(5)), or concatenating two values with merge.

These conversion operators and relationships use element terms and element relationships defined in multi-layer metamodel. An integration designer can use the model transformation user interface to define and arrange appropriate element terms and element relationships to create the required classes and operator specifications shown in FIGS. 4 and 5. To develop a specific transformation, the integration designer maps information in the source and target models to the appropriate classes and operator specifications. Classes and operator specification can be stored as executable code modules or mapping templates and stored in the template library. Each mapping module specifies how to convert a small fragment of information from the source to the generic metamodel, and then to the target metamodel. Typically, a mapping template describes the transformation pattern for a single conceptual entity of the application domain. Notably, it is possible to define mapping templates in either direction, i.e., with any of the sub-metamodels acting as the mapping source, and one of the other sub-metamodels as the mapping target. In this way larger transformations can be developed which re-use existing mapping templates.

Figure 6:
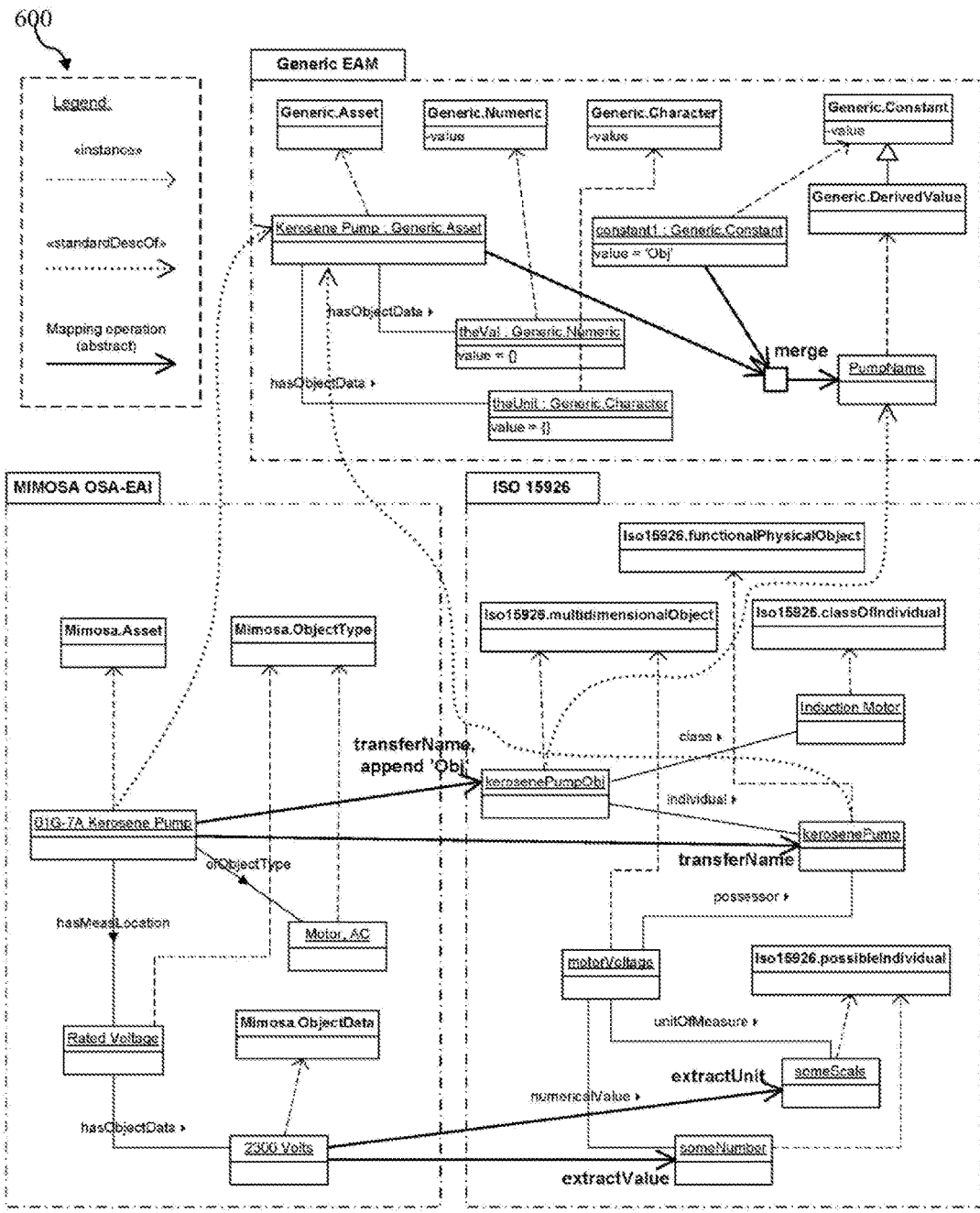
FIG. 6 is a schematic diagram of a mapping template for mapping a kerosene pump from the OSA-EAI to the ISO 15926 meta-model according to an embodiment.

For instance, in order to specify how to transform MIMOSA OSA-EAI data about a kerosene pump to the ISO 15926 standard we define a mapping as instance of the generic metamodel depicted in FIG. 4, having the MIMOSA OSA-EAI sub-metamodel as its source and the ISO 15926 sub-metamodel as target. To transform OSA-EAI entities to the generic metamodel, and then to ISO 15926 entities we employ the mapping and conversion operators introduced previously (see FIG. 5). FIG. 6 is a schematic diagram 600 of a mapping template for mapping a kerosene pump from the OSA-EAI to the ISO 15926 meta-model according to this embodiment.

While the OSA-EAI representation of the kerosene pump in FIG. 6 is self-explanatory, its ISO 15926 counterpart calls for some clarifying remarks. Most significantly, the ISO 15926 standard defines an extraordinarily generic data model. On top of this, the ISO 15926 "metaclasses" blur the metamodel level by incorporating metaclasses and even meta-metaclasses in the model without any semantic distinction except a naming convention. Conversely, the actual hierarchy of equipment types is not specified as part of the standard's class hierarchy, but stored in a relational schema rather than given in diagram form. Therefore, we use ClassOfIndividual together with MultidimensionalObject, PossibleIndividual, and FunctionalPhysicalObject as "metaclasses" in the same diagram. Furthermore, the ISO 15926 standards body semi-formally encourages the use of so-called "templates" (note that these templates are not mapping templates or data specifications but rather a way to introduce n-ary relationships by permitting the reification of associations as the OWL/RDF based repository cannot represent n-ary relations directly since OWL is restricted to binary relations). In FIG. 6 we employ two of these ISO "templates" in much simplified form. First, the classification of the kerosenePump object as an 'Induction Motor' with the help of a MultidimensionalObject instance follows the "classification of an individual" ISO template. Second, the connection between the kerosene pump and its 'rated voltage' property, again using a MultidimensionalObjcet instance, adheres to the "possession of an indirect property by a temporal part of a physical object" ISO template.

Compared to average sized models and mappings used in practice, the kerosene pump example has been simplified considerably. To allow for an easier presentation we intentionally keep the example and sample mapping template at minimum possible size. Nevertheless, it shows usage patterns for every operator family introduced at the metamodel level (Constant, generate, specify, export, convert). The sample mapping includes at least one example operator for each operator family.

The mapping template in FIG. 6 shows abstract mapping operations directly from the source to the target metamodel, which sketch the application user's intuitive view, while internally these operations correspond to mapping and conversion operators. In particular, the sample mapping employs the following operations to map an OSA-EAI representation of the sample kerosene pump to the generic metamodel, and the generic entities to ISO 15926 compliant data.

Operation transferName corresponds to the juxtaposition of two mapping operators, setName and exportName. First, setName reads the name of the kerosene pump Mimosa.Asset object, and assigns the name to the 'Kerosene Pump' object of type Generic.Asset. Secondly, exportName reads the name of the generic Asset object and assigns it to the appropriate ISO15926.functionalPhysicalObject instance.

Operation append 'Obj' employs a merge conversion operator, which concatenates the kerosene pump name returned by the setName operator with a string 'Obj'.

Finally, the extract Unit and extractValue operations correspond to sequences of split, setValue and exportValue operators on the kerosene pump's 'rated voltage' property. In order to derive the value and measure unit, the split operator applies on the pump's Mimosa.ObjectData instance representing the voltage property. The setValue operator then writes voltage 2300 to a Numeric object's value attribute, and measure unit 'Volts' to a Character object's value attribute. Two exportValue operators write the Numeric and Character value attributes to the target ISO 15926 objects, denoted someScale respectively someValue.

It is important to notice that the mapping template transforms the classification of the source model's kerosene pump as 'Motor, AC' in MIMOSA OSA-EAI to its equivalent classification as 'Induction Motor' in ISO 15926 without using any conversion operator. This is general domain knowledge and valid for all instances of such a kerosene pump. Thus, this kind of conversion without operators constitutes the fixed part of the mapping template. In contrast, the name, voltage, serial number, and other attributes are bound to some specific instance of a kerosene pump; this kind of information therefore builds the variable part of the mapping template. Every time we match the template to a source model and execute the mapping, the transformation engine of our mapping tool instantiates the operators with actual values from the source files (cf. FIG. 3).

In our metamodel-based integration framework the instance level merely serves as the interface between the application users and the mapping tool depicted in FIG. 3. Both ISO 15926 and MIMOSA OSA-EAI provide open, XML-based storage formats for serializing and exchanging model files. In order to convert the model and data of an input file to an equivalent representation in some target metamodel, the application user opens the input file with the mapping tool. Next they start the transformation process, whereupon the tool compares the input model with all source model fragments of the in tapping template library. In case of a successful match, the tool executes the mapping operators given in the template with the actual values read from the source model.

Should even several templates trigger, the tool collects and composes the target model fragments of all matching templates in a single output model. Finally, the tool presents the output model to the user who may process the result (e.g., for manual corrections). The final target model is ready to be saved to the file system, or exported using an arbitrary export format supported by the framework (e.g., into a database schema).

Figure 7:
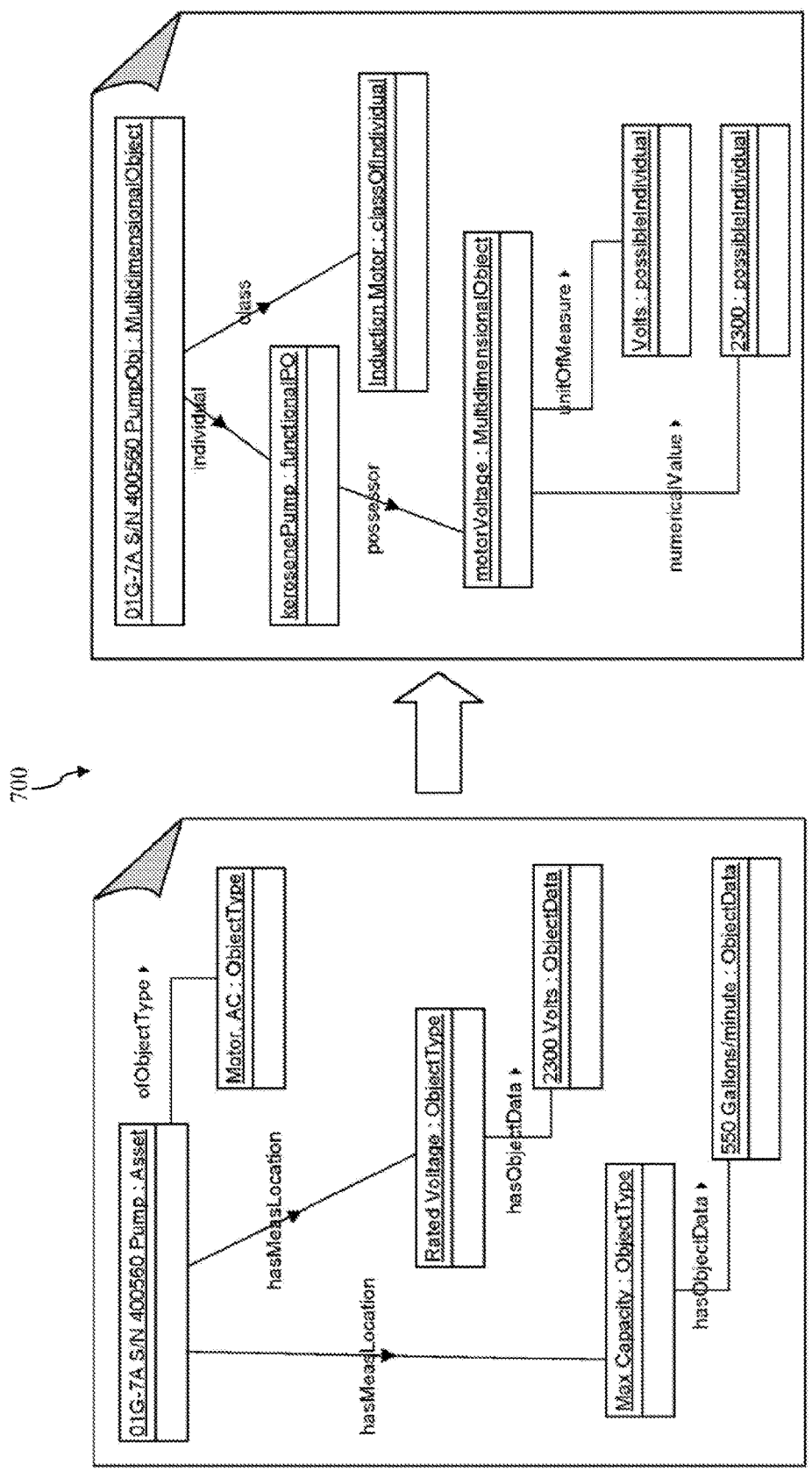
FIG. 7 is a schematic diagram of a kerosene pump modelled in OSA-EAI, and the result of applying the mapping template of FIG. 6 by a transformation engine to generate a model of the kerosene pump according to the ISO 15926 meta-model.

For example, an application user could be interested in converting the OSA-EAI model file of a kerosene pump named '01G-7A S/N 400560 Pump' to an ISO 15926 compliant model using our mapping tool. In this example, the given model corresponds exactly to the template we designed earlier, except that the sample model file gives an additional 'Max Capacity' property of the pump. FIG. 7 is a schematic diagram 700 of a kerosene pump modelled in OSA-EAI, and the result of applying the mapping template of FIG. 6 by a transformation engine to generate a model of the kerosene pump according to the ISO 15926 meta-model. The mapping template depicted in FIG. 5 produces the ISO 15926 representation of the given kerosene pump as depicted in the right-hand-side of FIG. 7. Note that the 'max capacity' property is ignored in the output model since it does not match the mapping template. To incorporate the 'max capacity' property in the output model would simply repeat the pattern employed for the 'rated voltage' property i.e. use a Mimosa.ObjectType and Mimosa.ObjectData instance connected with a hasObjectData relationship.

Figure 8:
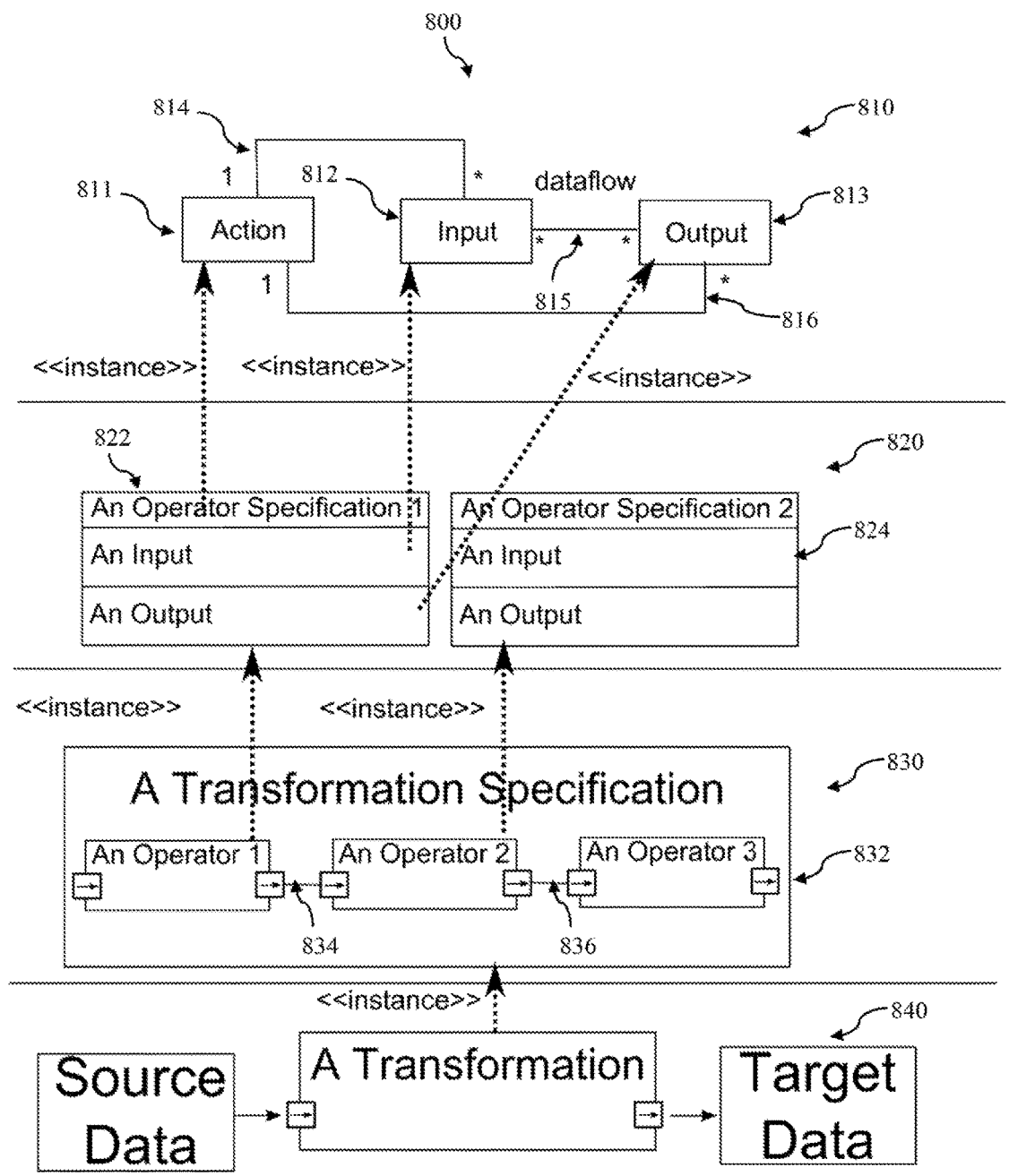
FIG. 8 is a schematic diagram illustrating a generic model transformation specification according to an embodiment.

In seeking to extend the flexibility and reusability of templates or transformation specifications, the metamodel approach has been implemented as a multilayer metamodel. The additional levels of abstraction were indicated in FIG. 1 and will now be further elaborated on. FIG. 8 is a schematic diagram 800 illustrating a generic model transformation specification used to generate a model transformation library of mapping templates (computer executable modules) according to an embodiment.

The highest layer 810 comprises a plurality of element terms ("Action" 811. "Input" 812 and "Output" 813) and a set of element relationships 814 815 816 between pairs of the element terms. There is a 1 to many cardinality relationship between instances of an action term and an input term 814, a 1 to many cardinality relationship between an action term and an output term 816, and a many to runny cardinality relationship between an input term and an output term 815. The element terms and relationships are similar to a language specification which defines a basic dataflow and thus the layer will be referred to as a language layer.

The next layer 820 (an intermediate layer) comprises a set of groups of element terms and relationships referred to as operator specifications 822 824. Each operator specification comprises an instance of an action term, at least one instance of an input term and at least one instance of an output term based upon the relationships defined in the language specification layer above. Each instance of a language term has a corresponding object type value, and an object type value may correspond to a plurality of instances of language terms. Each operator specification is effectively a class definition using instances of the element terms and relationships defined in the layer above (which are themselves class definitions). The operator specifications can be stored as computer codes or modules in the model transformation library. Each operator specification may be a separate module in the model transformation library.

The next layer 830 (an intermediate layer) comprises a set of element terms ("A transformation specification", "An operator 1", "An operator 2" and "An operator 3") and element relationships 834 836 linking element terms. The element terms in this layer are instances of element terms defined in higher levels (eg "A transformation specification" is an instances of an "Action", and "An operator 1" is an instance of "An operator specification 1"). The element term "An operator 1" is linked to "An operator 1" and "An operator 2" is linked to "An operator 3". The element terms and relationships are grouped together to define a transformation specification class 832. This class can be stored in an executable form in the model transformation library. This class is instantiated as element term "A Transformation" in the next layer 840, which is the lowest layer. The "A Transformation" element is a class which when instantiated by the transformation engine consumes the source data to produce the target data.

Figure 9:
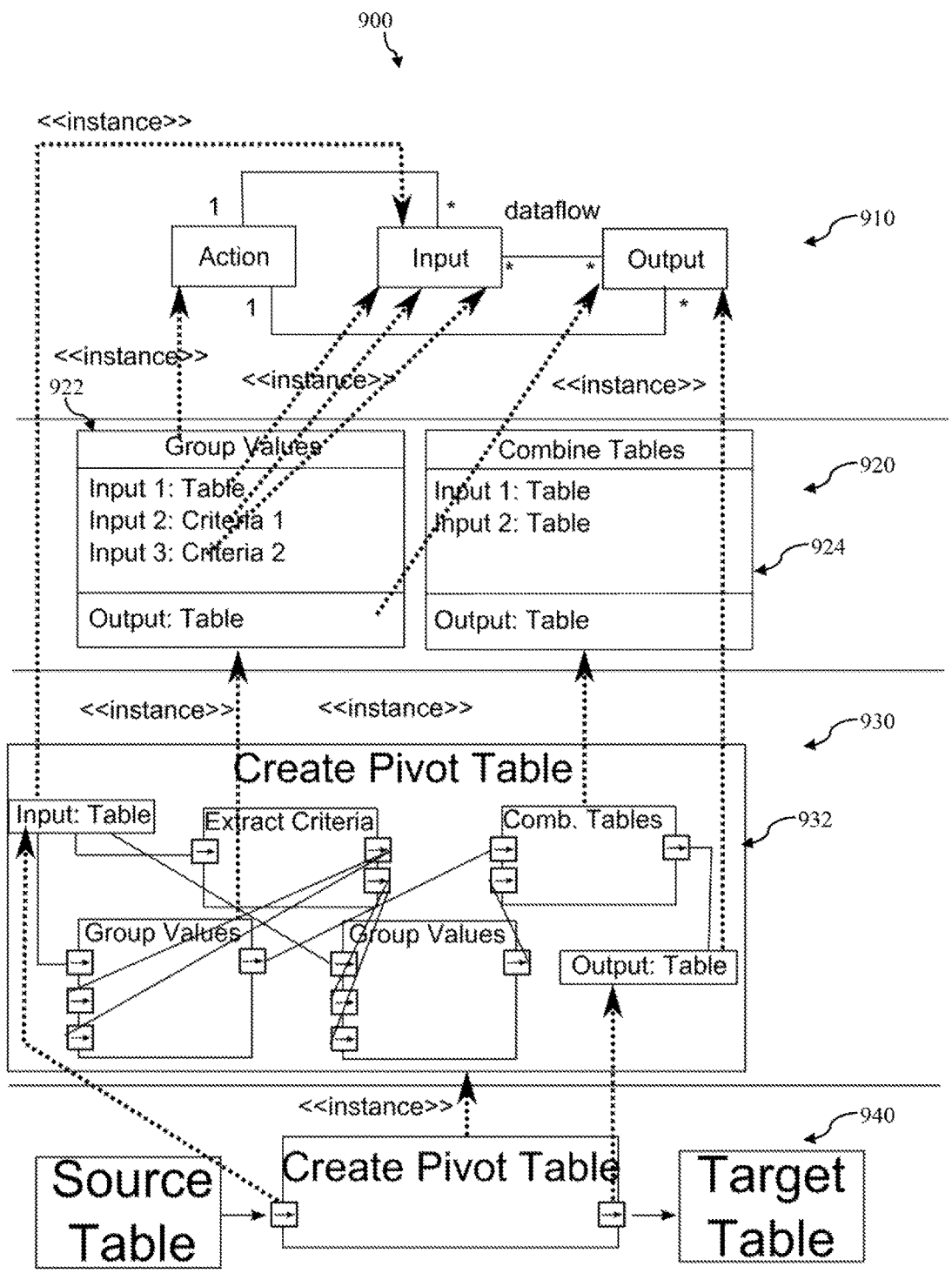
FIG. 9 is a schematic diagram illustrating a further example of the definition of a model transformation specification based upon the generic model transformation specification shown in FIG. 8.

FIG. 9 is a schematic diagram 900 illustrating a further example of the definition of a model transformation specification based upon the generic model transformation specification shown in FIG. 8. The upper level 910 is identical to the upper level 810 shown in FIG. 8. The next level 920 (the operator specification level in FIG. 8), comprises two groups (or classes) of operator specifications 922 924 in which the action term (or name term) has instantiations (ie values) of "Group Values" and "Combine Tables". The "Group Values" instance of an operator specification is defined as taking three inputs (ie three instances of input terms in the language specification) with values "Table", "Criteria 1" and "Criteria 2", and generating one output (ie one instance of an output term in the upper layer 910) with a value of "Table". The "Combine Tables" instance of an operator specification is defined as taking two inputs (ie three instances of input terms in the upper layer 910) both with values "Table", and generating one output (ie one instance of an output term in the upper layer 910) with a value of "Table".

The next layer 930 comprises a set of element terms and element relationships which define a single "Create Pivot Table" class (or group) 932. This group includes two instances of the "Group Values" operator class 922 an instance of the "Combine Tables" operator class 924, and an instance of another operator class (not shown) with an action instance value of "Extract Criteria" which takes one table input and extracts two output criteria. The "Create Pivot Table" class receives an input of type "Table" and produces an output of type "Table". As can be seen from the relationships between inputs and outputs of the instantiations of the operators' classes, the input table is provided to "Extract Criteria" to extract two criteria which, together with the original input table are provided as input to the "Group Values" operator. The second "Group Values" instance receives two criteria (via "Extract Criteria") and the input table to produce an output table. The two output tables from the two instances of the "Group Values" operator is provided as input to "Combine Tables" which provides an output table for the "Create Pivot Table" transformation specification. The bottom layer 940 of FIG. 9 shows how an instance of the "Create Pivot Table" transformation class is used to transform a source table in a first data specification to a target table in a second data specification.

The creation, viewing, and modification of the different layers of the transformation specification (the metamodel) can be performed in a model transformation user interface as described above and illustrated in FIG. 2. The model transformation user interface allows users to graphically develop a transformation process using the visual representations of the element terms, element relationships and layers. The model transformation user interface receives user inputs which allow a user to define new element terms, element relationships and layers, and group these together in a layer to define classes, as well as use existing groups (classes) available in the model transformation library. For example, a palette which contains visual representations of term elements and classes in upper layers can be provided. A user can click on an icon to select a specific term element or class, and then click in the layer window to select a location where an instance of the element term or class will be placed. Alternatively, keyboard shortcuts could be used to select the term element or class and to insert this under the current cursor position. As these element terms, element relationships and layers, and associated groups (classes) are defined or modified, the model transformation user interface generates computer code (eg source code or executable code) to implement the change. The computer code can then be stored in the model transformation library.

Further, the model transformation user interface allows creating or modifying an element term or an element relationship within a layer of the model transformation specification. Further, when this is performed the creation or modification is made immediately visible to all lower layers. For example, a user may decide that security class is required to control whether an action is allowed to be performed. In this case the user could create a new element term and name it "Security". Relationships to the "Action" element term and to the "Input" element term could be defined by creating two new relationship links between the two visual representations in the graphical user interface. Upon creation and linking of the Security element, each instance of an Action and each instance of an "Input" will have a security attribute that can be defined. The Create Pivot Table action could then include an instance of Security which checks if the Create Pivot Table can be performed based upon a security criterion (an input). In an alternatively embodiment, a new layer above the previous highest layer 910 could be defined comprising a single instance of a "Security" element term. The "Action", "Input" and "Output" element terms in layer 910 will then immediately become instances of this class, and thus have a security value which can bet set.

The development of model transformation specifications for use performing Engineering Asset Management of large (eg industrial scale) systems is considerably time consuming, and requires specialist skills. The model transformation methodology described herein can be used to reduce the time taken to develop transformation specifications whilst also providing flexibility. Users can visually define the transformation process and reduce the amount of computer code that needs to be written by a user. In some embodiments, the user can visually define and initiate the integration process without having to write any code, as this is generated by the system. This also provides a language independent method for defining the model transformation. The designer can concentrate on defining the process using the visual representations in the user interface, and implementation code can be generated by the user interface or backend system.

In one embodiment, a distributed approach to the development of transformation specifications is taken, in which a primary model transformation user interface is used to define the full multi-layer model transformation specification, and one or more secondary restricted user transformation user interfaces are created which allow other users to generate model transformations specifications based on the lower layers of the full multi-layer model transformation specification. That is an executable model can be generated which can be provided to other users which is interpreted by their transformation engine. The transformation engine of each secondary user has access to the full model, and is configured to allow the user to modify the lower layers and develop further model transformations—either for execution by their transformation engine or for use by others. As model development is complex this allows distribution of effort on the basis of expertise. For example, a highly experience developer could develop the full multi-layer model transformation specification using the primary model transformation user interface. They can make decisions upon when to add new element terms, element relationships to upper layers and even add upper layers when due properties are required. These changes can then be made available to all the secondary restricted user transformation user interfaces. These restricted user transformation user interfaces can be used to less experienced developers to implement develop data transformations between specific information systems.

In one embodiment, the secondary restricted user transformation user interfaces comprises the lowest two layers, or lowest three layers of the primary model transformation specification. This allows a developer to utilise existing classes defined in the higher layers (eg by the primary developer), and any class modules available in the model transformation library. For example, with reference to FIG. 8, the lower two layers 840 830 allows the user to develop new transformation specifications to map data between specific source and target systems (eg for a specific fuel pump) using existing operator specifications (eg classes) defined in the third layer 820, but not to add new operator specifications, or define higher layers. Alternatively, the user could be provided with three layers, in which case they can define new operator specifications in the third layer 820 according to element terms and element relationships in the highest layer 810, but not modify these or add higher levels.

Some computing languages such as Java are not purely object orientated, and the ability to provide the functionality that the creation or modification of an element term or an element relationship in a layer is made immediately visible to all lower layers requires considerable development work, compared to development of this feature in a more pure object orientate language such as Smalltalk. Thus, in one embodiment, the primary model transformation user interface is implemented in a first computing language such as Smalltalk. This is then used to generate either a model transformation library which stores executable code in a format which can be utilised by a second computing language (eg Java) or secondary restricted user transformation user interfaces which allow can be used to allow creation and executing of model transformations in a second computing language (eg Java).

In this embodiment, the secondary restricted model transformation user interface comprises the lowest two layers, or lowest three layers of the primary model transformation specification. This allows a developer with Java skills to visualise the model transformation specification, and allows them to develop new operator specification (eg classes) and specific data transformations. That is they can create and modify an element term or an element relationship within the lowest two layers of the model transformation specification and to generate a computer executable transformation engine, or add to the transformation model library. As in the previous case they are unable to add element terms or relationships to higher layers, or add higher layer. If a developer requires a new term or class to be defined in a higher layer then, the request can be passed to user of the first model transformation user interface. A second updated model transformation user interface or an updated model transformation library can then be exported from the primary model transformation user interface and supplied to the developer.

Figure 10:
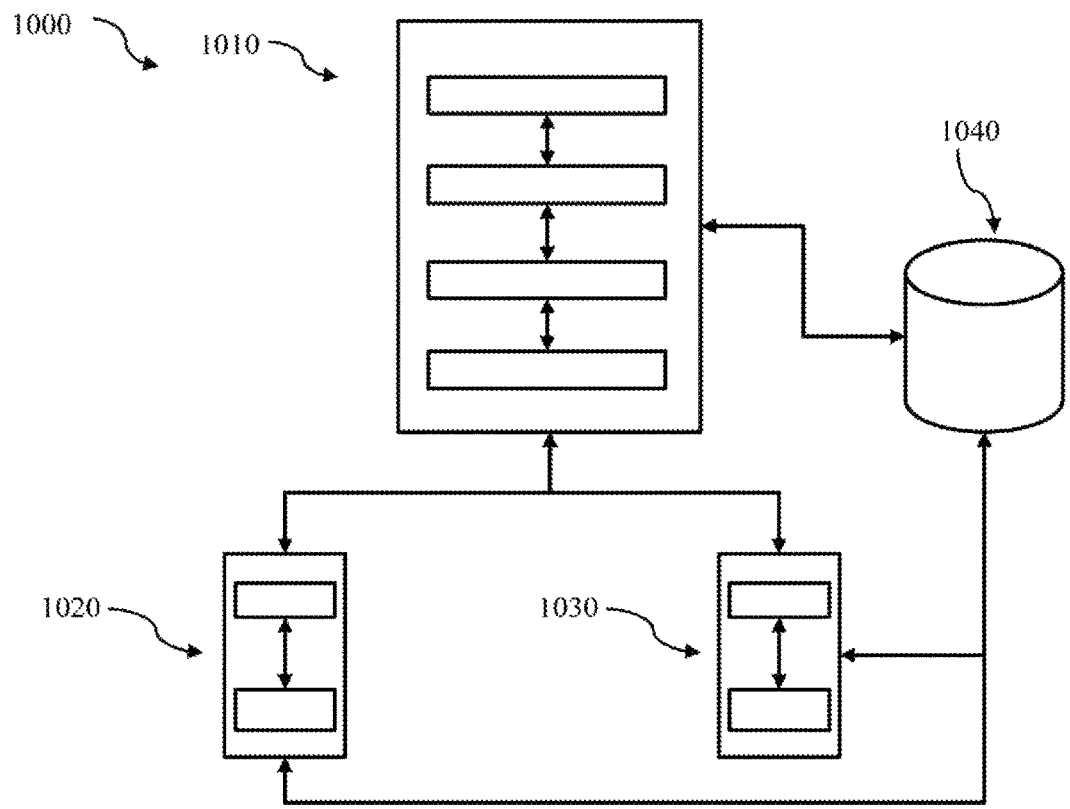
FIG. 10 is a schematic diagram of a distributed system according to an embodiment.

The implementation can be distributed to standalone. That is it can be in communication with either the primary model transformation user interface and/or the model transformation library. As changes are made to the model transformation specification, these changes are made available to the secondary model transformation user interface. This may be through messages or through the use of a model transformation library which stores updated code modules. FIG. 10 is a schematic diagram of a distributed system 1000 according to an embodiment. The primary model transformation user interface 1010 is in communication with secondary model transformation user interfaces 1020 and 1030. A model transformation library 1040 is in communication with both the primary model transformation user interfaces and the secondary model transformation user interface. In an alternative embodiment, the model transformation library and/or secondary restricted model transformation user interface can be exported using the model specification defined at a specific point of time, and then used independently. If updates are required, either a new secondary restricted model transformation user interface can be generated using the updated model specification, or an updated model transformation library or transformation engine can be provided.

Figure 11:
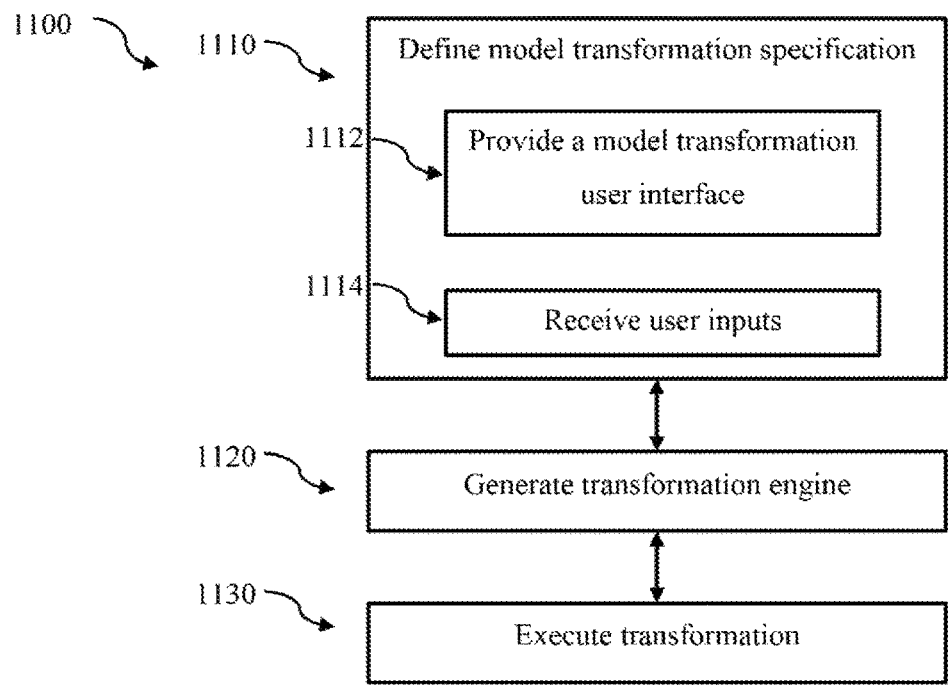
FIG. 11 is a flowchart of a method for performing a data transformation according to embodiment.

The above described method can be generalised as shown in FIG. 11 which is a flowchart 1100 of the method for performing a data transformation according to an embodiment. The method comprises defining the model transformation specification 1110 which includes sub steps of providing a model transformation user interface 1112 and receiving user inputs 1114. The model transformation specification is used to generate a transformation engine 1120. This may include generating a model transformation library and defining an instance of a specific data transformation. Finally the transformation is executed 1130 by the transformation engine to transform data between a source and target system.

Figure 12:
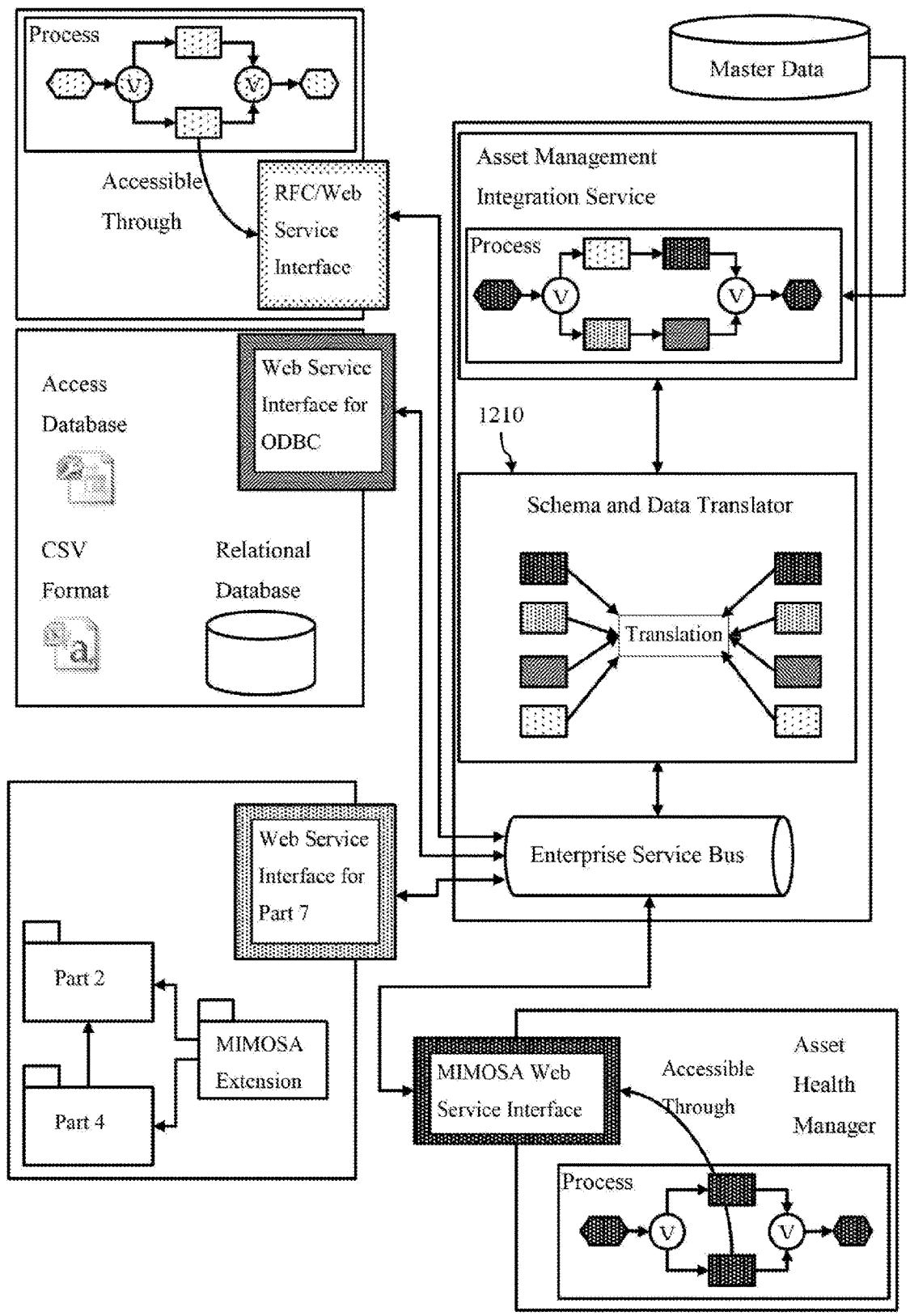
FIG. 12 is a schematic diagram of the integration of a monitoring system with an enterprise resource planning system using a transformation engine according to an embodiment.

The above described methodology can be used in an industrial setting such as for integrating a monitoring system with an enterprise resource planning systems (ERP). In such cases there is a need for the transfer of equipment data in both directions as part of a complex maintenance workflow sequence involving fault diagnosis, accessing part design information, and activating the ERP maintenance workflow on the business side. FIG. 12 is a schematic diagram 1200 of the integration of a monitoring system with an enterprise resource planning system using a transformation engine 1210 according to an embodiment.

In this embodiment, the integration environment uses a Service Oriented Architecture (SOA) based on Web services that allow a seamless integration of asset management tools by providing a common architecture. It supports vertical and horizontal integration and enables the plug-in of new tools without interfering with a running environment. The integration environment is independent of the underlying message exchange infrastructure in the way that it can be used as a standalone component, as a Web service or as a component for an Enterprise Service Bus. The architecture implements the business process and data transformation engine as separate components and specifies them independently from the underlying message exchange infrastructure. This has the advantage that it can be re-used with different infrastructures such as plain Service Oriented Architectures (SOA) or Enterprise Service Buses (ESB). The components that hold the integration logic and infrastructure are included in the shaded background of FIG. 12. External components that need to be integrated are for example SAP, relational databases. ISO 15926 compliant Web services or MIMOSA compliant Web services. Different components are communicated through an ESB although a simple Web service infrastructure could be also used as well. The Asset Management Integration Service (AMIS) contains a business process engine that holds the integration logic and drives the integration. This means that it collects data from multiple sources and distributes the data according to a business process. Between the collection and distribution the transformation engine 1210 can be called to transform data from one format (or specification) into another.

For example, if data needs to be transferred from SAP to a MIMOSA compliant service then this is modelled by three activities $a_1$, $a_2$ and $a_3$ in the AMIS graphical process editor which is then executed. During execution, $a_1$ calls a Web service through the ESB on the SAP side and extracts data from it. The output of $a_1$ is used as input for $a_2$. Activity $a_2$ calls a transformation service provided by the transformation engine which translates the SAP data from $a_1$ into a MIMOSA compliant format. The output of the translation is used as input into activity $a_3$ which calls the MIMOSA compliant Web service, again, through the ESB.

The use of model transformation methodology and associated systems described here provide an extensible model transformation approach. Whilst example embodiments have been described for engineering asset management, it is to be understood that the use of this methodology (and associated systems) is not limited to this application. Rather the methodology and associated systems can be used for applications in other industries or settings where there is need for information integration between different systems (eg health, between different business units or government departments etc). The use of a model transformation user interface to develop a multilayer model transformation specification provides an open framework that allows model developers to dynamically add functionality for the execution of transformations. The multilayered approach allows new transformation specifications and operators specifications to be added or modified, as well as allowing even higher levels of abstraction which allow the language used by operators to be redefined or modified. The model transformation user interface provides a graphical interface for visualising, developing, and modifying transformations. A model transformation library can be generated from the model transformation specification which was defined by the element terms, element relationships in the various layers, and the groups of terms and relationships (eg classes), defined in the layers. The system and method allows generation of a model transformation library and/or secondary model transformation user interfaces (or model transformation development environments). The model transformation library can then by be used by other development applications, including those which develop transformation in other computing languages which are not designed to easily implement the higher levels of abstraction possible with the current system. Similarly, secondary restricted model transformation user interfaces can be developed for use by less experienced users, or for development of transformation code in other computing languages. The methods and system described herein significantly increases the re-useability of transformation specifications or mapping templates and provides more flexibility and greater abstraction leading to faster development of specific transformations. Further, transformation specifications are easier to understand, control and manage. These benefits lead to substantial cost reductions in the development of transformation, as well as providing a sustainable framework for ongoing maintenance of existing transformations, and development of new transformations.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm, described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in an computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

A computer implemented system may comprise as display device, a processor and a memory and an input device. The memory may comprise instructions to cause the processor to execute a method described herein. The processor memory and display device may be included in a standard computing device, such as a desktop computer, a portable computing device such as a laptop computer or tablet, or they may be included in a customised device or system. The computing device may be a unitary computing or programmable device, or a distributed device comprising several components operatively (or functionally) connected via wired or wireless connections. The computing device may comprise a central processing unit (CPU), a memory, a display apparatus and may include an input device such as keyboard, mouse, etc. The CPU may comprises an Input/Output Interface an Arithmetic and Logic Unit (ALU) and a Control Unit and Program Counter element which is in communication with input and output devices (eg input device and display apparatus) through the Input/Output Interface. The Input/Output Interface may comprise a network interface and/or communications module for communicating with an equivalent communications module in another device using a predefined communications protocol (e.g. Bluetooth, Zigbee, IEEE 802.15, IEEE 802.11, TCP/IP, UDP, etc). A graphical processing unit (GPU) may also be included. The display apparatus may comprise a flat screen display (eg LCD, LED, plasma, touch screen, etc), a projector, CRT, etc. The computing device may comprise a single CPU (core) or multiple CPU's (multiple core). The computing device may use a parallel processor, a vector processor, or be a distributed computing device. The memory is operatively coupled to the processor(s) and may comprise RAM and ROM components, and may be provided within or external to the device. The memory may be used to store the operating system and additional software modules that can be loaded and executed by the processor(s).

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention.

The invention claimed is:

1. A computer implemented method for generating a computer executable transformation engine for transforming a first set of model elements in a first information system to a second set of model elements in a second information system, the method comprising:
   providing a model transformation user interface for displaying a visual representation of a model transformation specification to a user, the model transformation specification comprising:
      a plurality of user definable element terms;
      a plurality of user definable element relationships, each element relationship relating two or more element terms;
      a multilayer metamodel comprising at least three user definable hierarchically linked layers comprising a lowest layer, one or more intermediate layers, and a highest layer,
         wherein each layer comprises one or more user definable element terms, and is capable of having element relationships between the user defined element terms, and each of the element terms and each of the element relationships in the highest layer are instances of themselves and each element term is a separate class definition and each element relationship is a separate class definition such that the highest layer is a language layer, and
      each of the element terms and each of the element relationships in an intermediate layer is an instance of a group of one or more element terms and one or more element relationships defined in the next highest layer, wherein each group defines a transformation specification class for use in a lower layer and are themselves instances of a class defined in a higher layer, wherein the transformation specification class is stored in a model transformation library, and the lowest layer is a transformation execution layer, that comprises a computer-executable transformation engine, which receives the transformation specification class stored in the model transformation library; provides the transformation specification class to a transformation engine; and instantiates by the transformation engine the transformation specification class to a transformation element instance;

wherein each element term, each element relationship, and each layer has an associated visual representation; and executing the computer-executable transformation engine to perform steps of:

receiving the first set of model elements from the first information system;

transforming the first set of model elements into the second set of model elements using the transformation element instance;

sending the second set of model elements to the second information system; and receiving one or more user inputs for creating or modifying an element term or an element relationship within a layer of the model transformation specification, wherein the creation or modification of an element term or an element relationship in a layer is made immediately visible to all lower layers.

2. The method as claimed in claim 1, further comprising receiving one or more user inputs for creating an element term in a new layer above the highest layer, wherein the created element term is made immediately visible to all lower layers.

3. The method as claimed in claim 1, wherein the model transformation library comprises a plurality of computer executable modules for implementing the model transformation specification, and the transformation engine is generated using the model transformation library.

4. The method as claimed in claim 3, wherein the plurality of computer executable modules comprises code for implementing each of the plurality of terms and each of the plurality of relationships, and the step of receiving one or more user inputs for creating or modifying an element term or an element relationship within a layer of the model transformation specification further comprises immediately updating the plurality of computer executable modules.

5. The method as claimed in claim 1, wherein the model transformation user interface is implemented in a first computing language, and the method further comprises: generating one or more secondary model transformation user interfaces that display a visual representation of the model transformation specification to a user; allowing a user to create and modify an element term or an element relationship within the at least the lowest two layers of the model transformation specification, but not the highest layer; and generating a computer executable transformation engine.

6. The method as claimed in claim 5, wherein the model transformation user interface is implemented in the first computing language, and the one or more secondary model transformation user interfaces are generated in a second computing language.

7. The method as claimed in claim 5, wherein the model transformation user interface and the one or more secondary model transformation user interfaces are in communication with a common model transformation library comprising a plurality of computer executable modules for implementing the model transformation specification, and the transformation engine is generated using the model transformation library.

8. The method as claimed in claim 1, wherein the first information system stores model elements according to a first data specification, and the second information system stores model elements according to a second data specification, and the first data specification is a MIMOSA OSA-EAI compliant data specification and the second data specification is a ISO 15926 compliant data specification, or the second data specification is a MIMOSA OSA-EAI compliant data specification and the first data specification respectively is a ISO 15926 compliant data specification.

9. The method as claimed in claim 1, wherein the model transformation user interface is implemented in an object orientated language.

10. A computational transformation apparatus for generating a computer-executable transformation engine for transforming a first set of model elements in a first information system to a second set of model elements in a second information system, the apparatus comprising:

at least one processor;

an input/output interface;

and at least one memory, the memory comprising:

a model transformation user interface module comprising instructions for causing the processor to display a visual representation of a model transformation specification to a user, the model transformation specification comprising:

a plurality of user definable element terms;

a plurality of user definable element relationships, each element relationship relating two or more element terms;

a multilayer metamodel comprising at least three user definable hierarchically linked layers comprising a lowest layer, one or more intermediate layers, and a highest layer, wherein each layer comprises one or more user definable element terms, and is capable of having element relationships between the user defined element terms, and each of the element terms and each of the element relationships in the highest layer are instances of themselves and each element term is a separate class definition and each element relationship is a separate class definition such that the highest layer is a language layer, and each of the element terms and each of the element relationships in an intermediate layer is an instance of a group of one or more element terms and one or more element relationships defined in the next highest layer, wherein each group defines a transformation specification class for use in a lower layer and are themselves instances of a class defined in a higher layer, wherein the transformation specification class is stored in a model transformation library, and the lowest layer is a transformation execution layer, that comprises a computer-executable transformation engine, which receives the transformation specification class stored in the model transformation library; provides the transformation specification class to a transformation engine; and instantiates by the transformation engine the transformation specification class to a transformation instance;

wherein each element term, each element relationship, and each layer has an associated visual representation; and the model transformation library further configured to:
implement the model transformation specification; and the processor further hr configured to:
execute the transformation engine comprising instructions for causing the processor to perform steps of:
receiving the first set of model elements from the first information system via an input/output interface;
transforming the first set of model elements into the second set of model elements using the transformation element instance; and
sending the second set of model elements to the second information system; and the model transformation user interface is configured to receive one or more user inputs for creating or modifying an element term or an element relationship within a layer of the model transformation specification, wherein the creation or modification of an element term or an element relationship in a layer is made immediately visible to all lower layers.

11. The apparatus as claimed in claim 10, further comprising receiving one or more user inputs for creating an element term in a new layer above the highest layer, wherein the created element term is made immediately visible to all lower layers.

12. The apparatus as claimed in claim 10, wherein the model transformation library comprises a plurality of computer executable modules for implementing the model transformation specification, and the transformation engine is generated using the model transformation library.

13. The apparatus as claimed in claim 12, wherein the plurality of computer executable modules comprises code for implementing each of the plurality of terms and each of the plurality of relationships, and the step of receiving one or more user inputs for creating or modifying an element term or an element relationship within a layer of the model transformation specification further comprises immediately updating the plurality of computer executable modules.

14. The apparatus as claimed in claim 10, wherein the model transformation user interface is implemented in a first computing language, and the method further comprises: generating one or more secondary model transformation user interfaces that display a visual representation of the model transformation specification to a user; allowing a user to create and modify an element term or an element relationship within the at least the lowest two layers of the model transformation specification, but not the highest layer; and generating a computer executable transformation engine.

15. The apparatus as claimed in claim 14, wherein the model transformation user interface is implemented in the first computing language, and the one or more secondary model transformation user interfaces are generated in a second computing language.

16. The apparatus as claimed in claim 14, wherein the model transformation user interface and the one or more secondary model transformation user interfaces are in communication with the model transformation library and the model transformation library comprises a plurality of computer executable modules for implementing the model transformation specification, and the transformation engine is generated using the model transformation library.

17. The apparatus as claimed in claim 10, wherein the first information system stores model elements according to a first data specification, and the second information system stores model elements according to a second data specification, and the first data specification is a MIMOSA OSA-EAI compliant data specification and the second data specification is a ISO 15926 compliant data specification, or the second data specification is a MIMOSA OSA-EAI compliant data specification and the first data specification respectively is a ISO 15926 compliant data specification.

18. The apparatus as claimed in claim 10, wherein the model transformation user interface is implemented in an object orientated language.

19. A computer program product comprising a non-transitory computer readable medium containing instructions for causing a computer to perform a method for generating a computer executable transformation engine for transforming a first set of model elements in a first information system to a second set of model elements in a second information system, the instructions configuring the computer to:

provide a model transformation user interface for displaying a visual representation of a model transformation specification to a user, the model transformation specification comprising:
a plurality of user definable element terms;
a plurality of user definable element relationships, each element relationship relating two or more element terms;
a multilayer metamodel comprising at least three user definable hierarchically linked layers comprising a lowest layer, one or more intermediate layers, and a highest layer,
wherein each layer comprises one or more user definable element terms, and is capable of having element relationships, and
each of the element terms and each of the element relationships in the highest layer are instances of themselves and each element term is a separate class definition and each element relationship is a separate class definition such that the highest layer is a language layer, and
each of the element terms and each of the element relationships in an intermediate layer is an instance of a group of one or more element terms and one or more element relationships defined in the next highest layer, wherein each group defines a transformation specification class for use in a lower layer and are themselves instances of a class defined in a higher layer, wherein the transformation specification class is stored in a model transformation library, and
the lowest layer is a transformation execution layer, that comprises a computer-executable transformation engine, which receives the transformation specification class stored in the model transformation library; provides the transformation specification class to a transformation engine; and instantiates by the transformation engine the transformation specification class to a transformation instance; and
wherein each element term, each element relationship, and each layer has an associated visual representation;

receive the first set of model elements from the first information system;
transform the first set of model elements into the second set of model elements using the transformation element instance;
send the second set of model elements to the second information system; and
receive one or more user inputs for creating or modifying an element term or an element relationship within a layer of the model transformation specification, wherein the creation or modification of an element term or an element relationship in a layer is made immediately visible to all lower layers.

* * * * *